US006341242B1

(12) United States Patent
Mahmood et al.

(10) Patent No.: US 6,341,242 B1
(45) Date of Patent: *Jan. 22, 2002

(54) SYSTEM FOR CONTROLLING A PROCESS FOR INTERCONNECTION OF OPTICAL FIBERS INCLUDING FUZZY LOGIC CONTROL AND OPTIMIZATION ARCHITECTURE

(75) Inventors: Waqar Mahmood, Odenton; Jun Bao, Columbia; Andrei Csipkes, Savage, all of MD (US)

(73) Assignee: Ciena Corporation, Linthicum, MD (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/182,200

(22) Filed: Oct. 30, 1998

(51) Int. Cl.[7] .............................................. G06F 19/00
(52) U.S. Cl. ......................... 700/117; 700/50; 700/83; 700/108; 700/9; 706/900; 65/501; 65/DIG. 13; 345/965; 345/970

(58) Field of Search ........................... 700/2, 3, 9, 10, 700/50, 79, 80, 83, 117, 112, 108, 109, 122, 157, 216; 65/484, 485, 501, DIG. 13; 385/95, 96, 97, 98; 345/705, 965, 970; 706/52, 900, 904, 912

(56) References Cited

U.S. PATENT DOCUMENTS

| 4,763,272 A | * | 8/1988 | McLandrich ................. 700/117 |
| 4,837,704 A | * | 6/1989 | Lengefeld .................... 700/216 |
| 6,003,341 A | * | 12/1999 | Bloom ......................... 65/484 |
| 6,122,936 A | * | 9/2000 | Csipkes et al. ................ 65/485 |

* cited by examiner

Primary Examiner—Paul P. Gordon
Assistant Examiner—Steven R. Garland
(74) Attorney, Agent, or Firm—David L. Soltz; Daniel N. Daisak; Michael R. Cammarata

(57) ABSTRACT

Control of an interconnection process for optical fibers involves evaluating the status of all modules used in the process and moving an optical fiber through the process in accordance with the status of the modules. Such control allows more than one fiber, and more than one fiber type, to be processed simultaneously. The processing may be optimized using fuzzy logic to track when operations performed by a module are near completion. A graphical user interface displaying the movement of the optical fibers through the process may also be provided.

23 Claims, 6 Drawing Sheets

SYSTEM FOR CONTROLLING A PROCESS FOR INTERCONNECTION OF OPTICAL FIBERS INCLUDING FUZZY LOGIC CONTROL AND OPTIMIZATION ARCHITECTURE

BACKGROUND OF THE INVENTION

1. Field of the Invention

The present invention is generally directed to a system for controlling interconnection of optical fibers. More particularly, the present invention is directed to using status information of modules employed in the interconnection to control movement of the optical fibers through the process, to optimizing the use of modules employed in the interconnection using fuzzy logic control architecture, and to providing information regarding the operation of the modules to a user through a graphical user interface.

2. Description of Related Art

An apparatus which can integrate the various steps of an optical fiber interconnection process, including automating the handling and processing of the optical fibers during the optical fiber interconnection process, whether a fusion process or a connectorization process, is disclosed in commonly assigned, co-pending U.S. application Ser. No. 09/048,331, now U.S. Pat. No. 6,122,936, filed on Mar. 26, 1998 entitled "Apparatus for Integrating Steps of a Process for Interconnecting Optical Fibers" which is hereby incorporated by reference in its entirety. While this apparatus provides more efficient and uniform processing than previously available, further refinement on the automation is desired. In particular, there exists a need to control the movement of fibers through the system in accordance with the availablity of the modules. There further exists a need to optimize the use of the modules and other resources and the various tasks associated therewith. There also exists a need to display information regarding the operation of the modules to a user in a readily comprehensible form.

SUMMARY OF THE PRESENT INVENTION

Therefore, it is an object of the present invention to optimize the use of modules in an apparatus for interconnecting optical fibers.

It is another object of the present invention to use status information of the modules to control the movement of the optical fibers through the interconnecting process.

It is yet another object of the present invention to provide a user with readily comprehensible information regarding the operation of modules in an apparatus for interconnecting optical fibers.

It is a further object of the present invention to provide an architecture which can adapt the interconnecting for different types of optical fibers.

At least one of the above and other objects may be realized by providing a method for controlling an optical fiber interconnection processing system having a plurality of modules including polling all modules to be used during interconnection processing to determine a status of each module, determining an overall status of the optical fiber interconnection processing system based on said polling, and moving optical fibers through the interconnection processing system in accordance with the overall status.

The polling may include determining if a module being polled is working properly, determining if an optical fiber is positioned in a module being polled, determining if an optical fiber positioned in a module being polled is in good condition, and/or determining if a module being polled is busy. At least two optical fibers, of the same or of different types, may be processed simultaneously. The moving may be discrete between modules and the method may further include prioritizing the moving between modules using fuzzy logic based on the overall status.

At least one and other objects of the present invention may be realized by providing a computerized system for monitoring progress of optical fibers through an interconnection processing apparatus including a graphical user interface including a representation of modules in the interconnection processing apparatus and an identification of any optical fiber currently associated with a represented module tagged to that corresponding module.

The graphical user interface may further include a window displaying data of fibers having completed processing by the interconnection processing apparatus. The window may display data regarding optical fibers which have successfully been processed by the interconnection processing apparatus in one portion thereof and data regarding optical fibers which have not successfully been processed by the interconnection processing apparatus in another portion thereof. The graphical user interface may further include, when a module is selected, a window displaying a status of the module being selected. The graphical user interface may further include, when a module is selected, a window displaying parameters used in the processing performed by the module being selected. The representations of the modules may be arranged in an order in which they would be used in the interconnection processing apparatus.

At least one of the above and other objects may be realized by a method for controlling an optical fiber interconnection processing apparatus including determining a rule base for controlling the apparatus, setting a membership function for each module and each task performed thereby in the optical fiber interconnection processing apparatus, and moving optical fibers through the optical fiber interconnection processing apparatus in accordance the rule base and the membership functions.

The membership function for a module may represent a level of availability of the module. The membership function for a task may represent a level of completeness of the task.

At least one of the above and other objects may be realized by an apparatus for controlling an optical fiber interconnection processing system including a plurality of modules including a supervisory controller in communication with each of the modules, the supervisory controller receiving status information from each module and determining an overall status of the interconnection processing system and a handling device delivering optical fibers to the modules in accordance with the overall status, the handling device being in communication with the supervisory controller.

When the overall status indicates more than one fiber is being processed simultaneously, the supervisory controller may prioritize movement of the more than one fiber by the handling device in accordance with the overall status. When a loading deck module provides information regarding fiber type to the supervisory controller, and when the overall status indicates more than one type of fiber is being processed simultaneously, the supervisory controller may prioritize movement of the more than one type of fiber by the handling device in accordance with the overall status.

BRIEF DESCRIPTION OF THE DRAWINGS

The above and other features of the present invention will become readily apparent to those skilled in the art from the detailed description which follows and from the accompanying drawings, in which.

DETAILED DESCRIPTION OF PREFERRED EMBODIMENTS

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the invention would be of significant utility without undue experimentation.

Figure 1:
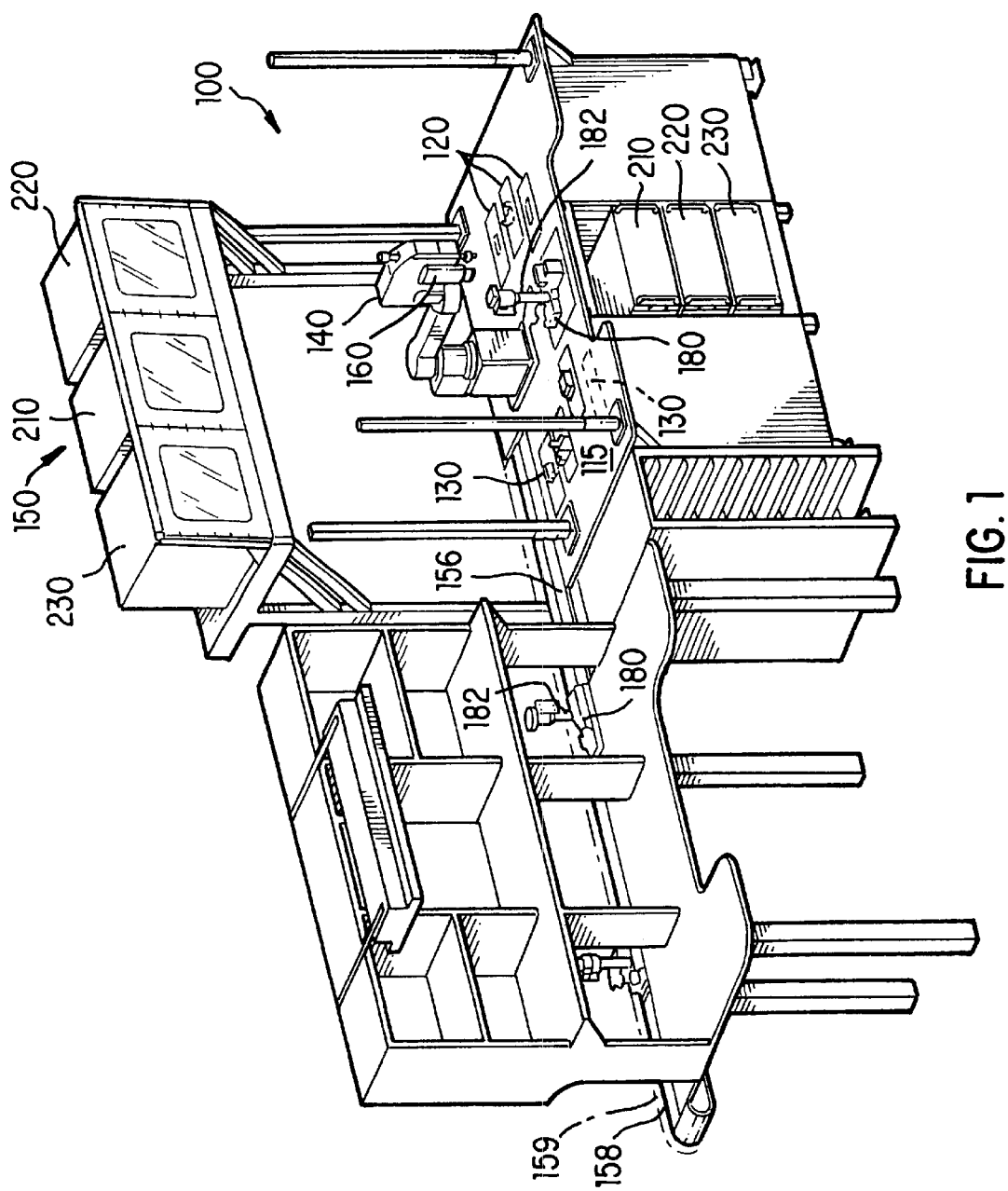
FIG. 1 is a perspective drawing of an integrated and automated optical fiber interconnect workstation.

FIG. 1 is a perspective view of the optical fiber interconnect workstation 100 disclosed in commonly assigned U.S. application Ser. No. 09/048,331 entitled "Apparatus for Integrating Steps of a Process for Interconnecting Optical Fibers". The optical fiber interconnect workstation 100 is used to integrate and automate certain portions of the optical fiber interconnect process, as well as facilitate handling of the optical fibers between steps of the process. An optical fiber precision handling tool, such as that disclosed in commonly assigned U.S. application Ser. No. 09/017,327, now U.S. Pat. No. 6,088,503 entitled "Optical Fiber Precision Handling Tool", filed Feb. 2, 1998, which is hereby incorporated by reference in its entirety, may be used with the optical fiber interconnect workstation as described below. The optical fiber precision handling tool may be used to align and handle optical fibers between steps of the interconnection process. Portions of application Ser. Nos. 09/017,327 and 09/048,331 have been reproduced in appropriate sections below for convenience and ease of reference.

To better understand the operation of the optical fiber interconnect workstation 100, the general steps of an optical fiber fusion splicing process are described below. While the description below refers to an exemplary fusion process, one of ordinary skill in the art would realize that the integrated and automated optical fiber interconnect workstation (hereinafter "optical workstation") of the present invention can be adapted to perform any conventional fusion or connectorization process, including splicing of different types of fibers.

Briefly, by way of background, the optical fiber fusion process requires a number of steps as herein described. Note that most fibers are individually coated with one or two polymeric coatings, typically 65 to 185 $\mu$m in thickness, to preserve the intrinsic strength of the fiber and permit fiber handling. Accordingly, in a first stripping step, this protective coating must be removed, either mechanically, thermally, or by using a chemical solvent. Next, the stripped fiber ends are cleaned in an alcohol or other cleaning solution using an ultrasonic cleaner. Thereafter the fiber is cleaved by scribing the fiber with a diamond or carbide scribe to induce a break. The fiber ends are aligned and then undergo the actual fusion splicing step. After the splicing step, an ultraviolet (UV) recoat step is performed to cover the exposed stripped and spliced portions of the fiber with a polymer for protection against the outside environment. Finally, a pull-test is performed on the fibers to test the strength of the splice, usually with at least a 150 Kpsi pull being applied to the fibers.

The ability to conduct such a fiber splicing process with a yield of 95%, including splicing of dissimilar fibers, represents a substantial challenge to optical device manufacturers. In an effort to achieve this yield goal and to sustain such a yield goal over an extended period of time, the optical workstation described herein has been developed. Each of the components of the optical workstation contributes to reducing the set-up, preparation and execution time of the optical fiber interconnect operation, while dramatically To increasing the yield.

As shown in FIG. 1, the automated optical workstation 100 comprises a planar work surface 115 having a plurality of openings 120. The openings 120 are provided to facilitate the incorporation of a plurality of optical fiber processing modules 130 that are disposed or suspended within respective of the plurality of openings 120. In FIG. 1, several different types of modules 130 are shown disposed within the openings 120. Note that any number of means may be used to fix the module 130 within the opening 120. For example, the module 130 can incorporate a lip portion that would rest on a ledge extending into the opening 120 to suspend the module 130 within the opening 120. Alternatively, the top plate of the module 130 can be made larger than the opening 120 to suspend the module 130 within the opening 120.

Loading and unloading decks or conveyors 156 and 158 are provided at or near the workstation 100. The loading deck 156 is used for fiber cassette preparation and sequencing before the optical interconnect processes are performed, and the unloading deck 158 is used to transfer the fiber cassette for optical testing after the optical interconnect processes are performed. A rejecting deck 159, which receives fiber cassettes which have failed some inspection or test of the process, may also be provided.

Each of the modules 130 is separately manufactured to execute one or more of the different steps of a typical optical fiber interconnection process, including either fusion or connectorization processes. Note that one of the modules 130 in FIG. 1 is represented as a cube-shaped structure (dashed lines) for ease of illustration. However, it is understood that any number of conventional or custom modules 130 may be incorporated into the openings 120 of the automated optical workstation 100 of the present invention, with the ultimate configuration or shape of the module 130 being determined by the connectorization process step executed by the module 130.

Moreover, the openings 120 are shown in a rectangular form for illustration purposes only, it being understood that other different shaped openings can be employed, depending on the optical processing step being performed and the shape of the module. In addition, although seven openings 120 are shown in FIG. 1, the exact number, placement and spacing of the openings 120 in the planar surface 115 can be altered within the scope of the present invention, depending on the interconnection task that will be performed.

The modularization of the process steps and the open architecture of the optical workstation are advantageous in that they allow for independent reconfiguration of the modules 130 as well as "plug and play" type modularity for the entire system. Also, enhancements in certain modules can be readily incorporated by simply swapping out the enhanced module for the prior module.

Figure 2A:
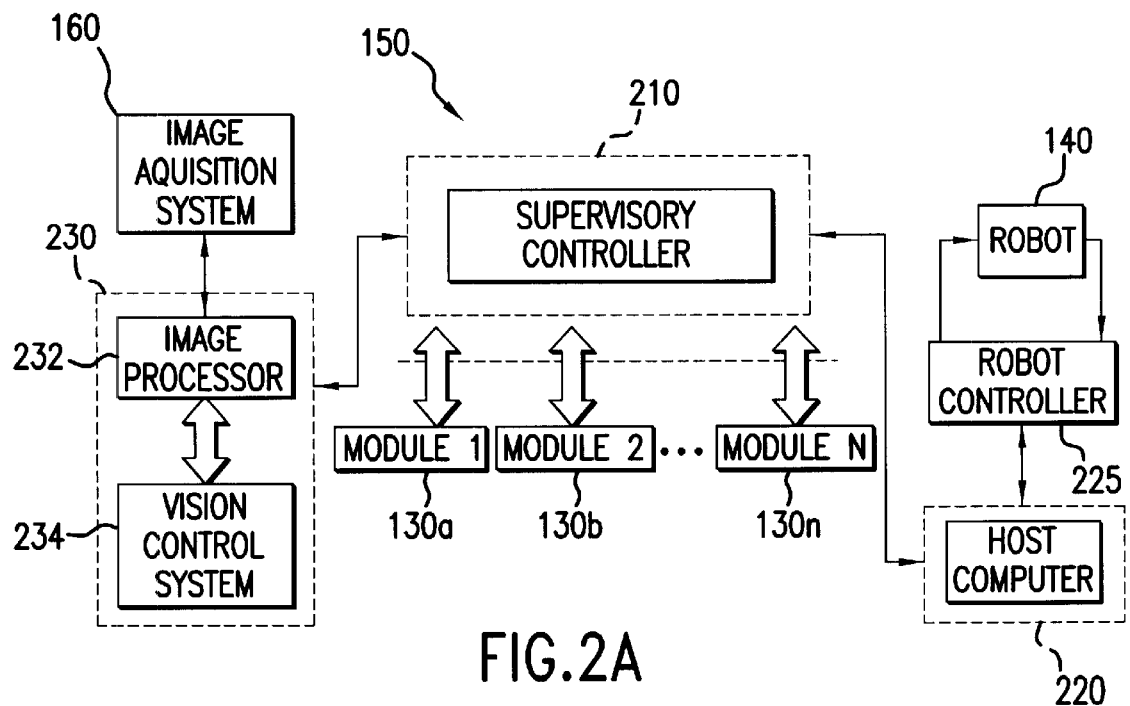
FIG. 2A is a block diagram of a control system for the optical fiber interconnect workstation of FIG. 1.

A material transfer mechanism, such as robot arm 140, is arranged above the planar surface 115 and is connected to a manufacturing control system 150, a detailed schematic diagram of which is shown in FIG. 2A. The robot arm 140 may be selected from any of the commercially available workstation robots. The robot arm 140 should have a work envelope sufficient to cover each of the modules 130 and cycle times that are sufficient so as not to impact the sequence time for the optical interconnect process. Alternatively, a gantry system may be substituted for the robot arm 140.

A precision handling tool 180, hereafter referred to as a metrology frame, may be used with the optical workstation 100 of the present invention to hold, transport and align the optical fibers to be connected, and the fiber cassettes from which the optical fibers extend, during an optical fiber interconnection process. The robot arm 140 or gantry system can pick-up and transport the entire metrology frame 180 between the various modules 130 arranged on the planar surface 115.

A vertical support member 182 of the metrology frame 180 can support a plurality of fiber cassette holders in a substantially horizontal orientation with reference to the vertical support member 180. The ability to accommodate a plurality of fiber cassette holders allows several fiber cassettes to be simultaneously attached to the metrology frame 180. The advantage of providing several fiber cassettes on the metrology frame 180 is that splicing or connecting operations can be serially performed on the optical fibers wound on each of the fiber cassettes. Also, in many cases, an optical fiber from one fiber cassette is spliced to an optical fiber of another fiber cassette. By having two or more of the fiber cassettes readily available and in the same place, the splicing or connecting operations can be executed more quickly. Moreover, different types of fibers may be wound on respective of the fiber cassettes, thereby allowing for ease of splicing of the different types of fibers.

An image acquisition system 160 (i.e., a video camera) is incorporated with the optical workstation 100, preferably attached to a portion of the robot arm 140, for guiding and coordinating the movements of the robot arm 140 and the movement of the metrology frame 180 between the modules 130 during the optical fiber interconnection process. The image acquisition system 160 may also be used for quality control, process sequencing, and inspection purposes.

An exemplary manufacturing control system 150 for controlling the modules 130, the robot arm 140, and the image acquisition system 160 of the optical workstation is shown in FIG. 2A. While a single computer can be used to centrally control the modules, robot and image acquisition system, preferably, as shown in FIG. 2A, a distributed control architecture is provided.

In FIG. 2A, the manufacturing control system 150 includes a supervisory controller 210, which is preferably a personal computer system running at least Windows 3.1 or other equivalent controller. The supervisory controller 210, in turn, separately controls the operation of the robot 140, the image acquisition system 160, and the plurality of modules 130 through the distributed control architecture.

Specifically, a separate host computer 220 controls the operation of the robot 140 through a robot controller 225 via a standard interface. The host computer 220 is preferably a personal computer system running at least Windows 3.1 or other equivalent controller. The host computer 220 and the supervisory controller 210 communicate via a standard interface.

The image acquisition system 160 is controlled by a separate image processing computer system 230 containing an image processor 232 and vision control system 234. The image processing computer system 230 is preferably a personal computer running at least Windows 95 or Windows NT or other equivalent controller. The image processing computer 230 and the supervisory controller 210 also communicate via a standard interface. The image acquisition system 160 (i.e., video camera) communicates with the image processing computer 230 via a standard interface, e.g., the NTSC (National Television Standards Committee) standard for composite video signals.

Each of the optical processing modules 130 would preferably incorporate an embedded dedicated processor that communicates with the supervisory controller 210 through a standard interface. Alternatively, the functions of the embedded dedicated processors can be collectively incorporated in a separate computer system to provide the interface between the modules 130 and the supervisory controller 210.

The distributed architecture as shown in FIG. 2A increases the reliability of the manufacturing process by reducing the risk associated with total machine failure. For instance, if any part of the distributed architecture fails, the remaining portions will still work in a semi-automated mode. Also, if a portion of the system is experiencing a problem, troubleshooting, repair or replacement time is significantly decreased. The distributed control system shown in FIG. 2A thus allows for more reliable and efficient control of the simultaneous operations of the modules, robot and image acquisition system.

Figure 2B:
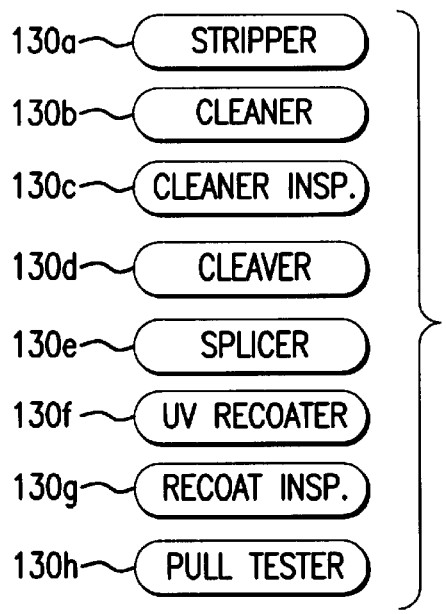
FIG. 2B illustrates examples of the modules to be used in fusion process.

When the optical processing modules 130 are configured for a fusion splicing operation as shown in FIG. 2B, the modules 130 would include a stripper module 130a containing a stripping solution into which the optical fiber is dipped to chemically remove the protective coating. Next, the stripped fiber ends are cleaned in an alcohol or other cleaning solution using an ultrasonic cleaner provided in a cleaner module 130b. The cleaned fiber is the inspected in a cleaner inspection module 130c. In a fiber cleaver module 130d, the fiber is cleaved by scribing the fiber with a diamond or carbide scribe to induce a break. The fiber ends then undergo the actual fusion splicing in a fusion splicer module 130e. In the splicer module, portions of the metrology frame 180 would move so as to decrease the distance between the optical fiber ends while aligning the optical paths of the fibers so as to execute the actual fusion splicing. After the splicing, an ultraviolet (UV) recoater module 130f covers the exposed stripped and spliced portions of the fiber with a polymer for protection against the outside environment. The UV recoat is inspected in the recoat inspection module 130g, after which a pull-test is performed on the fibers to test the strength of the splice in a pull-tester module 130h. In the pull-test module, portions of the metrology frame 180 would pull the fibers away from each other in a diverging manner to test the strength of the splice.

Alternatively, during a connectorization process, the optical processing modules 130 would include at least a connector preparation module, an aligning module, a polishing module, and a testing module.

Figure 3A:
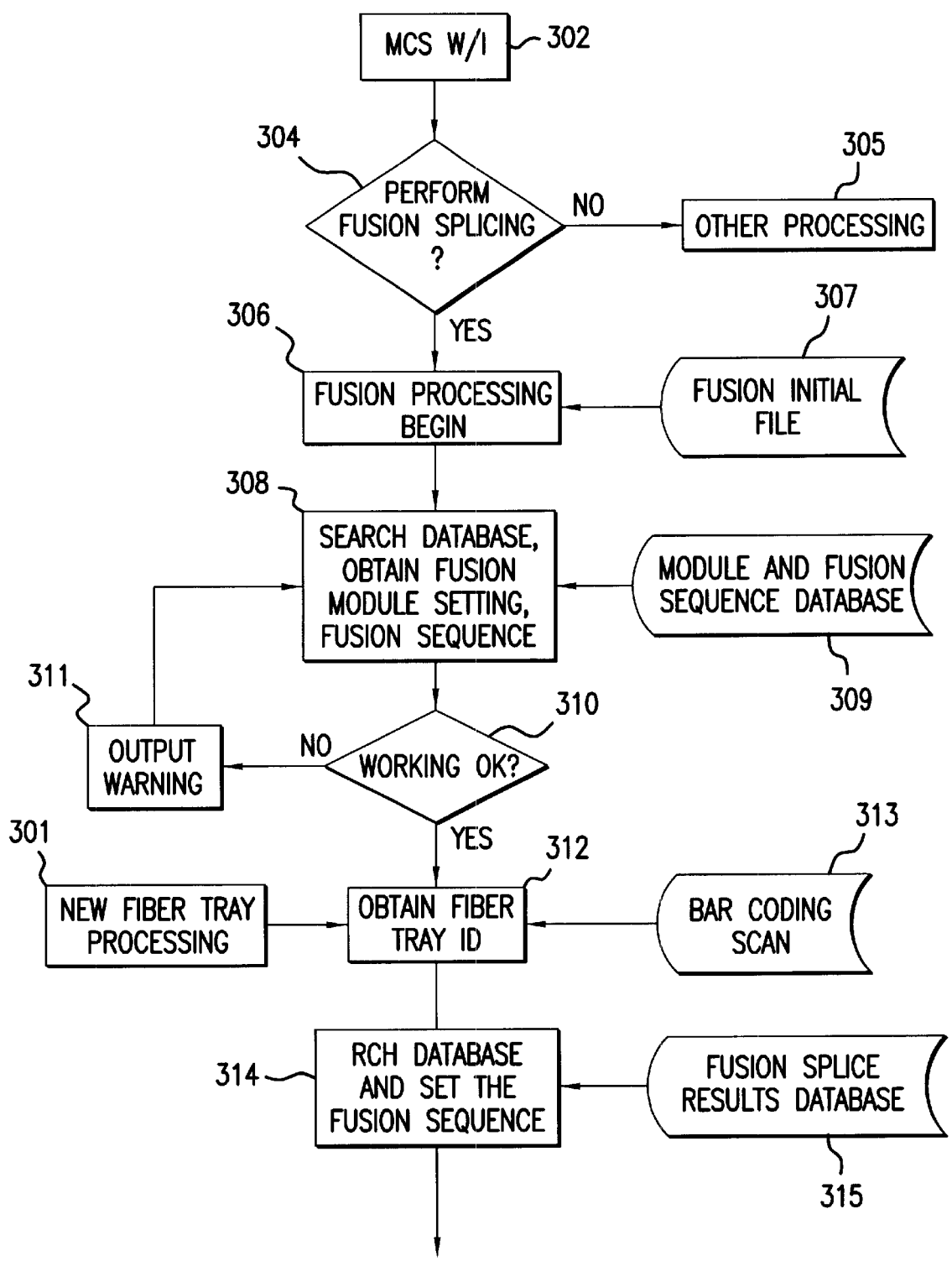
FIG. 3A is a flow chart for the initialization of the fusion process.
Figure 3B:
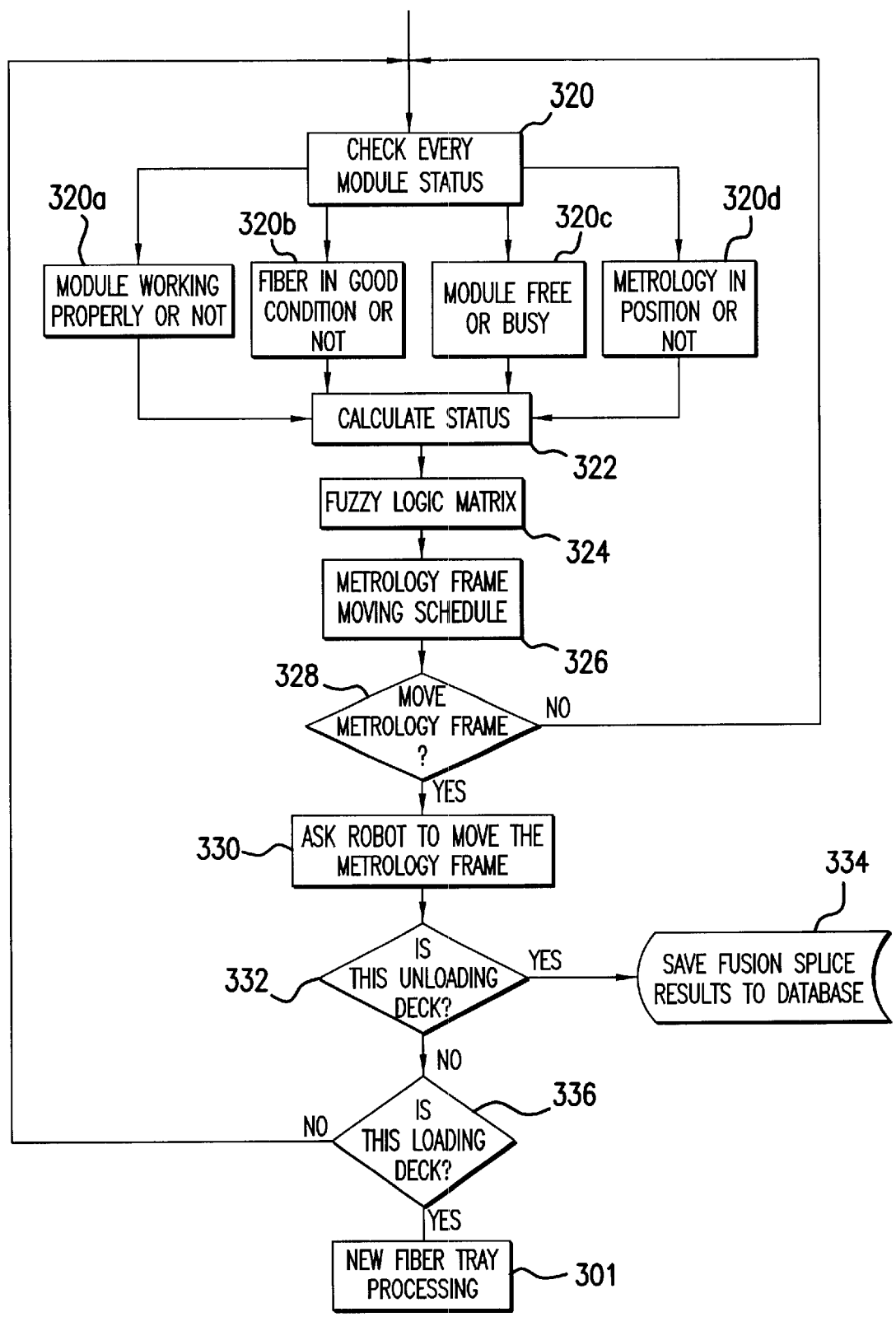
FIG. 3B is a flow chart for the controlling of an optical processing module.

The flow of the control system 150 is shown in FIGS. 3A and 3B. In step 302, the overall manufacturing control system performs a workstation initialization. Step 304 determines whether a fusion processing operation is to be performed. If not, the flow proceeds to step 305, in effect bypassing the fusion processing in favor of another fiber process, such as a connecterization process.

If fusion processing is to be performed, the fusion processing begins in step 306, with the initialization in accordance with a fusion initial file 307. The fusion initial file 307 contains identifying data such as the operator and the workstation for the fusion process, as well as resource data for the various fusion modules employed. In step 308, the module and fusion sequence database 309 is searched to determine the status of the modules for the fusion process. Every module, including the optical processing modules 130, robot 140, the loading deck 156, the unloading deck 158, and the optional rejecting deck 159, has status information associated therewith. The status information includes whether the module is functioning properly, whether the metrology frame is positioned for the module, whether the module is busy, and whether the fiber has passed or failed inspection.

Step 310 checks to see if the status of the modules is within parameters to begin the process. If it is, then the flow proceeds to step 312. Otherwise, the flow proceeds to step 311 where a warning signal is output indicating which module(s) is not ready and then returns to step 308.

When a new fiber tray is to be processed as indicated in step 301, step 312 scans a bar code on a fiber cassette to be processed and the fiber cassette identification number (ID) is thereby obtained. Identifying bar codes can be provided in any number of manners. For example, a bar code may be associated with every splice in a cassette, or provided just on the cassette itself, with a user entering the splice number when the cassette is scanned. Alternatively, a bar code may be provided only on the cassette with the fusion sequence being obtained from a data base. In this latter preferred scenario, a fusion sequence is associated with the ID and the pass/fail status of the previous splice from that cassette is tracked. If the first splice in the sequence passed, then the next time the same cassette is scanned, then the fusion sequence proceeds to the second splice. If the first splice in the sequence fails, then the splice for the next fusion sequence remains the same. A database 315 matching IDs with parameters for the fusion processing is searched and the fusion sequence for the cassette having the ID obtained in step 312 is set in step 314.

After the initial set-up described above, the flow proceeds to step 320 in which the fusion sequence is polled, i.e., the status of every module is checked, to optimize the flow of the fusion process. This polling is for each module, including the unloading deck, the optical processing modules, and the loading deck.

Step 320a determines if the module being polled is working properly or not. Step 320b determines if the fiber is in good condition based on all previous inspections performed by modules. Step 320c determines whether the module is busy or not. Once processing by the module is complete, the module busy signal will be turned off. Step 320d determines whether the metrology frame, or other fiber holding/aligning device, is in position or not.

This polling is performed for all modules. In the inspection modules, if repeat attempts to reach an acceptable level are feasible and desired, it is advantageous to provide the tray which has failed inspection back to the module for performing the process, the result of which was being inspection. For example, if the tray fails the cleaner inspection, the tray may be returned to the cleaner to repeat the cleaning process. How many times the tray may fail before proceeding the next module may be predetermined or may vary in accordance with how close the tray is to passing the inspection. Advantageously, after any inspection or test, if the tray ultimately fails, rather than proceeding through any remaining modules, information regarding the failure is stored and the failed tray is output to a rejecting/unloading deck (shown in FIG. 1).

Once all modules have been polled, the overall status of the fusion system is calculated in step 322. This overall status is used in step 324 to create a fuzzy logic matrix, which is used in step 326 to determine a metrology frame moving schedule. The use of fuzzy logic is discussed in detail below.

If step 328 determines that the metrology frame is not to be moved, the flow return to step 320 to again assess the status of the fusion system. If the metrology frame is to be moved, step 320 directs the robot to move the metrology frame in accordance with the metrology frame moving schedule from step 326. If step 332 determines that the metrology frame is moved to the unloading deck, step 334 saves fusion splice results to a database and returns to step 320. If step 336 determines that the metrology frame is moved to the loading deck, new fiber tray processing is to begin, and the flow proceeds to step 301 in FIG. 3A. If not, the flow returns to step 320.

Figure 4A:
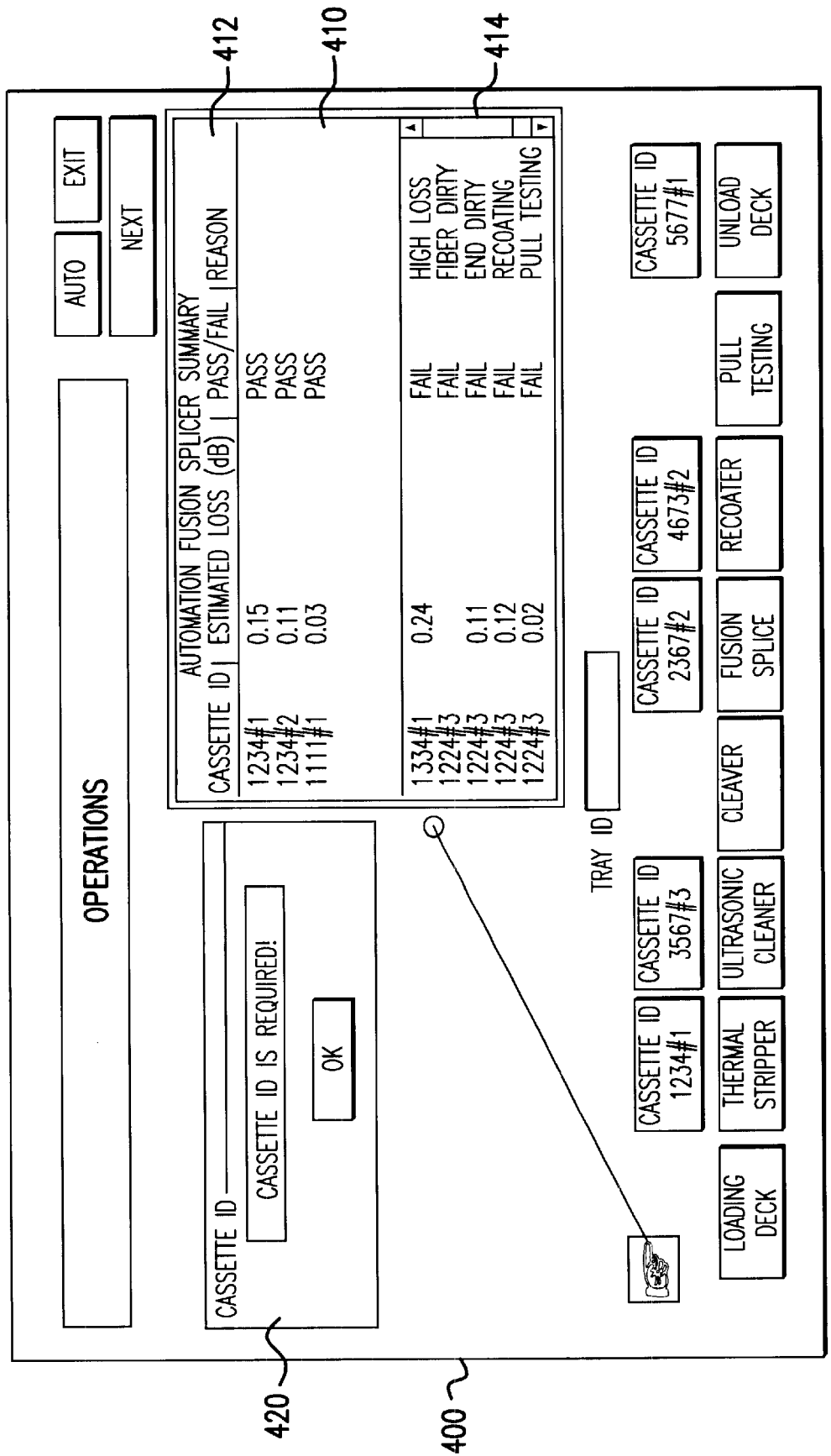
FIGS. 4A and 4B show examples of the graphical user interface.
Figure 4B:
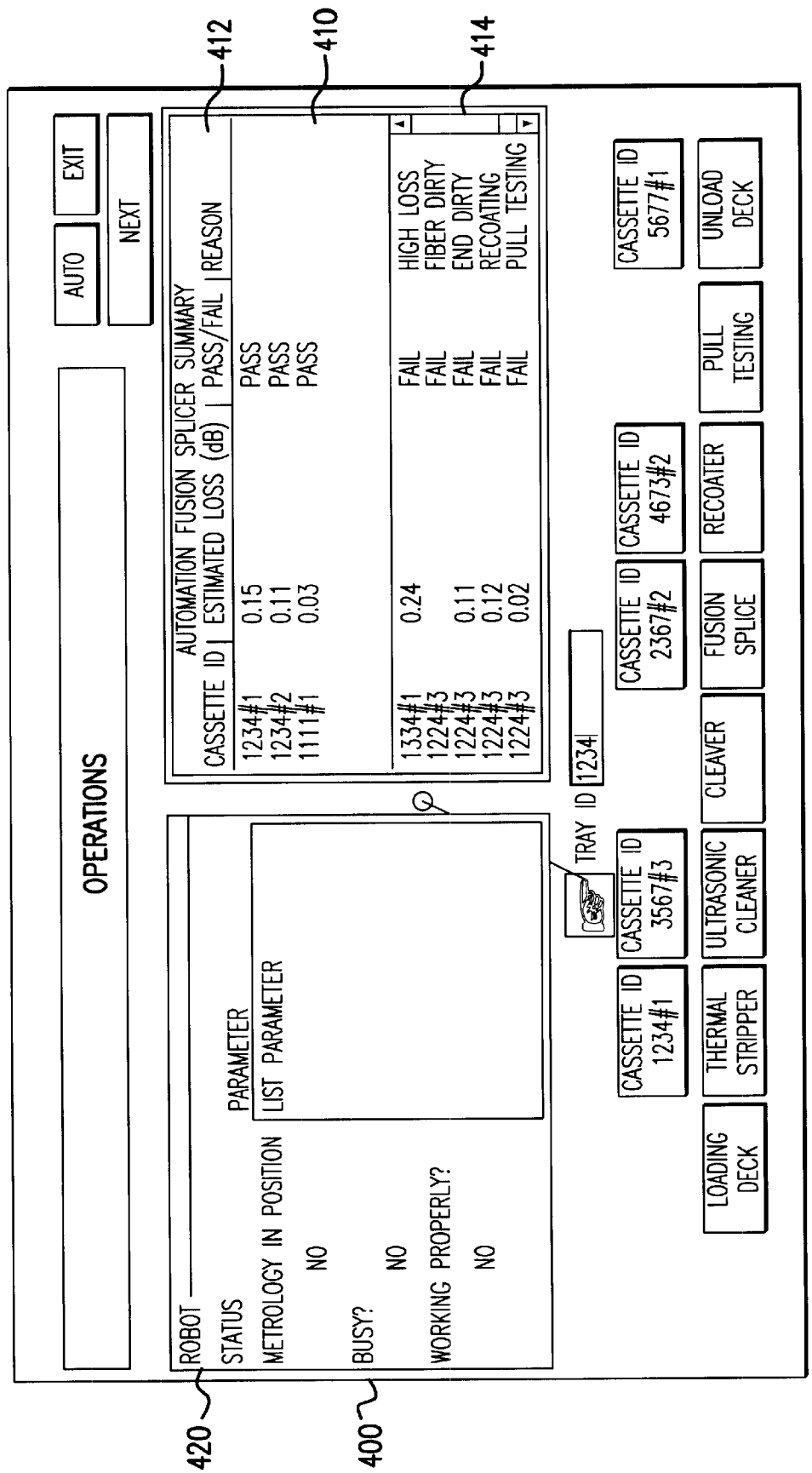

A graphical user interface (GUI) for use with the fusion system is shown in FIGS. 4A and 4B. At the bottom of the screen 400, the loading deck module, the optical processing modules, other than the inspection modules, and the unloading module are schematically represented. The ID of a cassette positioned by the metrology frame, if any, is shown above each module, so a user can track the progression of the cassettes through the fusion processing. A result window 410 provides information about cassettes on which fusion processing has been completed. A top portion 412 of the results window 410 displays the cassette ID, the estimated loss (from the splicing machine) and the pass/fail status of the cassettes which have completed the fusion processing and passed the inspection and pull test modules. A bottom portion 414 of the results window 410 displays the cassette ID, the estimated loss, the pass/fail status, and the reason for failure of the cassettes which have failed. A user may scroll to view data regarding additional failed cassettes.

When one of the modules displayed at the bottom of the screen 400 is selected by a user, a window 420 will appear providing information regarding that module. For example, as shown in FIG. 4A, when the loading deck module is selected, the window 420 displays a warning that the cassette ID is required when there is nothing in the loading deck. When the ultrasonic cleaner module is selected, as shown in FIG. 4B, the window displays the status as determined in the flow chart of FIG. 3C, i.e., whether the metrology frame is in position, whether the module is busy, and whether the module is working properly. When the module is working properly and is processing a cassette, the window further provides the corresponding parameters of the particular process of the module for that cassette.

While the representations of the modules in FIGS. 4A and 4B are on the bottom of the screen and progress from left to right in the order in which they are used in the processing, any arrangement which allows a user to follow the flow through the processing could be used. Further, while the identification of the cassette is on top of the representation of the corresponding module in FIGS. 4A and 4B, this identification could be in any manner that clearly linked the cassette and the module in which the cassette is positioned. In addition to the use of the database 315 to set the fusion sequence, a user may use the GUI to remotely reconfigure the modules for processing a particular fiber.

If all modules of the fusion process took the same amount of time to complete their respective operations, control of the fusion system would be fairly straightforward. However, the processing times of the modules varies widely. For example, the time for the splicing operation is typically an order of magnitude longer than other processing times. Further, these processing times vary with the type of fiber being processed and the splice being performed. The first priority for optimizing the process is to keep the module having the longest processing time, typically the splicer, busy.

Each module in the fusion system can be treated as a resource for performing a task or a series of tasks. Each resource is either "busy" or "available" depending on the presence of a cassette therein and whether the cassette can be moved to the next module, and each task performed by a module is either "processing" or "done." However, since the delivery of the cassettes to the modules in the fusion processing is performed by a single robot, which does not move instantaneously, the robot will need to know before the task is done that the task is nearing completion and that the next module in the sequence is available to receive the cassette. Therefore, intermediate states indicating that the task is becoming completed and that the module is becoming available are needed so that the robot can respond to optimize the flow of the fusion processing. While an arbitrary threshold could be set, for example, to divide the state "processing" from the state "becoming completed," this would result in a discontinuous change and would not provide any information regarding the how close the task is to being "done".

A way around this problem in accordance with the present invention is to make the states "fuzzy", i.e., to allow them to change gradually from one state to the next. The "fuzzy" states are defined using "membership functions" such that the state no longer jumps abruptly from one state to the next, but rather loses value in one membership function while gaining value in the next. Typically, these values range between 0 and 1. For example, when a task has just started, the "processing" membership function will be 1, while the "done" membership function will be 0. When this distribution changes will depend upon the length of the task. In this way, the membership functions can be adapted so that the same membership function value for different tasks represent the same length of time. When the task is nearing completion, for example, the "processing" membership function may have a value of 0.2 while the "done" membership function has a value of 0.8. When the task is actually done, the "processing" membership function has a value of 0 while the "done" membership function has a value of 1. A similar distribution is also established for the resource. The decision as to what to have the robot do next is based on the truth value of the membership functions indicating the completion status of the task and the availability status of the resources, and on a set of "rules" for sequential fusion processing.

The status of each module in the fusion processing system may be represented by a status vector X which may be determined as show in equation (1) below. Let T be a set of tasks, R a set of resources, and U as set of inputs:

$$\overline{X}=(F_r \circ \overline{R}_a)S(F_r \circ \overline{T}_c)S(I_n \circ \overline{U}) \quad (1)$$

Where,
○ indicates t-s or min-max composition;
s indicates s-norm or max operation;
$X \in F^{n}x$ is the fuzzy state vector;
$R_a \in F^{n}f$ is the resource availability vector;
$F_r^{n_x \times n_t}$ is the resource requirement matrix;
$T_c \in F^{n}{}_t$ is the task completion vector;
$F^{n_x \times n_t}$ is the task sequencing matrix; and
$I_n$ and U are the input matrix and the input vector, respectively.

Since the supervisory controller cares about when tasks are done and resources are available, the vectors are composed of truth values of membership functions over time.

Once the status is known, the next module the robot is to deliver a cassette to may be determined by considering the following task start equation (2) and the resource release equation (3) implemented by the supervisory controller.

$$T_s = E_t \circ X \quad (2)$$

$$R_r = E_r \circ X \quad (3)$$

Where,
$T_s \in B_t^n$ is the next task start vector;
$E_t^{n_t \times n_x}$ is the next task start matrix;
$R_r \in B^{n_t}$ is the next resource release vector; and
$E_r^{n_t \times n_x}$ is the next resource release matrix.

The system design rule base defines the task sequencing matrix and resource requirement matrix as well as the next start matrix and the resource release matrix. The matrix representation provides a structure for the supervisory control computer implementation. The use of fuzzy sets in representing the status of the system is more natural and results in prompt controller action with fewer delays. The model can be used to optimize the operations to satisfy certain objective functions. The optimization involves fuzzy comparison of competing objectives and accordingly tuning of the system matrices.

The modeling approach allows the concurrently occurring events to be expressed in a discrete parallel system, such as a Fuzzy Petri net. The feature of equivalence with the Petri net provides repeatability and consistency to the modeling approach. Further details of the modeling approach are disclosed in Waqar Mahmood and George Vachtsevanos, "Fuzzy Linguistic Modeling and Control of Manufacturing Systems", 4th IEEE/IRNIA Conference on Emerging Technologies and Factory Automation, Paris, France, 1995, and Waqar Mahmood and George Vachtsevanos, "An Intelligent Approach to Modeling and Reconfigurable Control of Manufacturing Systems", 5th IEEE/IRNIA Conference on Emerging Technologies and Factory Automation, Kauai, Hawaii, U.S.A., 1996, which are hereby incorporated by reference in their entirety. The use of this rule base with the status vector allows the control of the processing and the movement of the optical fibers through the process to be optimized.

Further, the use of fuzzy logic assists in making the control of the fusion system reconfigurable, i.e., adapt to processing of different types of fibers, which will have different processing requirements. The use of fuzzy logic helps in simultaneous processing of different types of fibers to be processed simultaneously, since the allocation of the use of the robot is based solely on the availability of resources and completion of tasks.

Thus, the system in accordance with the present invention provides independent control of individual modules, transport of the optical fibers to different modules, identification, tracking and coordination of the optical fibers through the process, and the capability of handling various optical fibers simultaneously with varying configuration and control requirements. Further, fuzzy logic architecture in accordance with the present invention may be used to perform sequencing, scheduling and prioritization, resulting in optimization of the process. Additionally, a user friendly graphical user interface for monitoring the process, preferably including display of status information and data on optical fibers for which processing has been completed, may be provided in accordance with the present invention.

Although preferred embodiments of the present invention have been described in detail herein above, it should be clearly understood that many variations and/or modifications of the basic inventive concepts herein taught, which may appear to those skilled in the art, will still fall within the spirit and scope of the present invention as defined in the appended claims and their equivalents.

What is claimed:

1. A method for controlling an optical fiber interconnection processing system having a plurality of modules comprising:
   polling all modules to be used during interconnection processing to determine a status of each module;
   determining an overall status of the optical fiber interconnection processing system based on said polling; and
   moving optical fibers through the interconnection processing system in accordance with the overall status.

2. The method of claim 1, wherein said polling includes determining if a module being polled is working properly.

3. The method of claim 1, wherein said polling includes determining if an optical fiber is positioned in a module being polled.

4. The method of claim 1, wherein said polling includes determining if an optical fiber positioned in a module being polled is in good condition.

5. The method of claim 1, wherein said polling includes determining if a module being polled is busy.

6. The method of claim 1, further comprising interconnection processing multiple optical fibers simultaneously.

7. The method of claim 1, further comprising interconnection processing multiple types of optical fibers simultaneously.

8. The method of claim 1, wherein said moving is discrete between modules and said method further comprises prioritizing said moving between modules using fuzzy logic based optimization in accordance with the overall status.

9. The method of claim 1, further comprising providing an open architecture for controlling the modules.

10. The method of claim 1, further comprising:
    providing a graphical user interface; and
    remotely reconfiguring the modules via the graphical user interface to handle a plurality of fiber types.

11. A computerized system for monitoring progress of optical fibers through an interconnection processing apparatus comprising a graphical user interface including a representation of modules in the interconnection processing apparatus and an identification of any optical fiber currently associated with a represented module tagged to that corresponding module.

12. The system of claim 11, wherein said graphical user interface further includes a window displaying data of fibers having completed processing by the interconnection processing apparatus.

13. The system of claim 12, wherein said window displays data regarding optical fibers which have success fully been processed by the interconnection processing apparatus in one portion thereof and data regarding optical fibers which have not successfully been processed by the interconnection processing apparatus in another portion thereof.

14. The system of claim 11, wherein said graphical user interface further includes, when a module is selected, a window displaying a status of the module being selected.

15. The system of claim 11, wherein said graphical user interface further includes, when a module is selected, a window displaying parameters used in the processing performed by the module being selected.

16. The system of claim 11, wherein said representations of said modules are arranged in an order in which they would be used in the interconnection processing apparatus.

17. A method for controlling an optical fiber interconnection processing apparatus comprising:
    determining a rule base for controlling the apparatus;
    setting a membership function for each module and each task performed thereby in the optical fiber interconnection processing apparatus; and
    moving optical fibers through the optical fiber interconnection processing apparatus in accordance the rule base and the membership functions.

18. The method of claim 17, wherein said membership function for a module represents a level of availability of the module.

19. The method of claim 17, wherein said membership function for a task represents a level of completeness of the task.

20. An apparatus for controlling an optical fiber interconnection processing system including a plurality of modules comprising:
    a supervisory controller in communication with each of the modules, the supervisory controller receiving status information from each module and determining an overall status of the interconnection processing system; and
    a handling device delivering optical fibers to the modules in accordance with the overall status, the handling device being in communication with the supervisory controller.

21. The apparatus of claim 20, wherein when the overall status indicates more than one fiber is being processed simultaneously, the supervisory controller prioritizes movement of the more than one fiber by the handling device using fuzzy logic based optimization in accordance with the overall status.

22. The apparatus of claim 20, wherein one of the modules is a loading deck and provides information regarding fiber type to the supervisory controller, and wherein when the overall status indicates more than one type of fiber is being processed simultaneously, the supervisory controller prioritizes movement of the more than one type of fiber by the handling device using fuzzy logic based optimization in accordance with the overall status.

23. The apparatus of claim 20, wherein the supervisory controller may control the handling device to return an optical fiber to a module which has already processed the optical fiber if the supervisory controller determines failure of the optical fiber may be remediable.

* * * * *